United States Patent
Dawas

(10) Patent No.: US 11,725,412 B2
(45) Date of Patent: Aug. 15, 2023

(54) CHEMICAL STORAGE TANK ASSEMBLY

(71) Applicant: Mohamad Dawas, Dickinson, TX (US)

(72) Inventor: Mohamad Dawas, Dickinson, TX (US)

( * ) Notice: Subject to any disclaimer, the term of this patent is extended or adjusted under 35 U.S.C. 154(b) by 203 days.

(21) Appl. No.: 17/343,860

(22) Filed: Jun. 10, 2021

(65) Prior Publication Data

US 2022/0396961 A1 Dec. 15, 2022

(51) Int. Cl.
| | | |
|---|---|---|
| *E04B 2/04* | (2006.01) | |
| *E04B 1/32* | (2006.01) | |
| *E04H 7/18* | (2006.01) | |
| *C04B 28/18* | (2006.01) | |
| *F28F 1/00* | (2006.01) | |
| *C04B 111/00* | (2006.01) | |
| *C04B 111/23* | (2006.01) | |

(52) U.S. Cl.
CPC .............. *E04H 7/18* (2013.01); *C04B 28/186* (2013.01); *E04B 1/3205* (2013.01); *E04B 2/04* (2013.01); *F28F 1/00* (2013.01); *C04B 2111/00646* (2013.01); *C04B 2111/23* (2013.01); *E04B 2001/327* (2013.01)

(58) Field of Classification Search
CPC .... E04B 1/32; E04B 1/3205; E04B 2001/327; E04B 2/04; E04H 7/02; E04H 7/18; C04B 28/186; C04B 2111/00646; C04B 2111/00948; C04B 2111/23; B65D 88/744
See application file for complete search history.

(56) References Cited

U.S. PATENT DOCUMENTS

| | | | | |
|---|---|---|---|---|
| 624,270 | A * | 5/1899 | Vrooman | E04B 2/12 122/46 |
| 862,418 | A * | 8/1907 | Street | E04G 21/1866 249/11 |
| 982,080 | A | 1/1911 | McCoy | |
| 1,108,007 | A | 8/1914 | Ribbe | |
| 1,857,995 | A * | 5/1932 | Alles | E04B 2/04 52/604 |
| 2,413,243 | A | 12/1946 | Neff | |
| 5,105,966 | A | 4/1992 | Fort | |
| 6,913,645 | B2 | 7/2005 | McNulty, Jr. | |
| 7,305,798 | B1 * | 12/2007 | Heierli | E01D 4/00 405/125 |
| 7,694,479 | B2 * | 4/2010 | Killen | E04C 2/328 52/309.4 |
| D666,306 | S | 8/2012 | Belue | |

(Continued)

FOREIGN PATENT DOCUMENTS

| | | | | |
|---|---|---|---|---|
| CN | 108979280 | A * | 12/2018 | ............... E04H 7/02 |
| CN | 109653366 | A * | 4/2019 | ........... E04B 1/3205 |

(Continued)

*Primary Examiner* — Ryan D Kwiecinski

(57) ABSTRACT

A chemical storage tank assembly for storing sulfuric compounds includes a plurality of bricks that is each comprised of basalt. In this way each of the bricks can resist ingress of sulfuric compounds into the bricks. The plurality of bricks are arranged to define a floor, a plurality of walls and a roof of a storage tank to contain sulfuric compounds. A grout is positioned between each of the bricks for binding the bricks together to define the storage tank. Additionally, the grout is comprised of calcium silicate to resist the ingress of sulfuric compounds into the grout.

5 Claims, 3 Drawing Sheets

(56) References Cited

U.S. PATENT DOCUMENTS

| | | | | |
|---|---|---|---|---|
| 8,603,375 | B2* | 12/2013 | Simmons | F17C 3/022 |
| | | | | 220/560.04 |
| 9,481,993 | B2* | 11/2016 | Drew | E04G 21/1866 |
| 10,538,383 | B2* | 1/2020 | Al-Mehthel | B65D 90/022 |
| 11,525,277 | B2* | 12/2022 | NakaMats | B64G 99/00 |
| 11,536,017 | B2* | 12/2022 | VanHoose | E03F 5/10 |
| 2018/0155928 | A1* | 6/2018 | Hohmann, Jr. | E04C 3/02 |

FOREIGN PATENT DOCUMENTS

| | | | | |
|---|---|---|---|---|
| CN | 110566026 A | * | 12/2019 | B65D 88/02 |
| CN | 112983089 A | * | 6/2021 | E02D 29/16 |
| CN | 114457935 A | * | 5/2022 | |
| CN | 115075484 A | * | 9/2022 | |
| FR | 3094383 A1 | * | 10/2020 | |
| GB | 2422156 A | * | 7/2006 | E04B 2/02 |
| KR | 2120002 B1 | * | 6/2020 | B65D 90/04 |
| WO | WO201211860 | | 8/2012 | |
| WO | WO-2016036354 A1 | * | 3/2016 | E04B 2/40 |

\* cited by examiner

CHEMICAL STORAGE TANK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to storage tank device and more particularly pertains to a new storage tank device for storing sulfuric compounds. The device includes a bricks comprised of basalt and grout comprised of calcium silicate. The bricks and grout are employed to build a storage tank with a domed roof for storing sulfuric compounds. In this way the storage tank can maintain structural rigidity without the use of steel reinforced concrete with will degrade and fail due to corrosion from the sulfuric compounds.

(2) Description of Related Art Including Information Disclosed Under 37 CFR 1.97 and 1.98

The prior art relates to storage tank devices including a variety of storage tanks that are comprised of concrete. The prior art discloses method of manufacturing industrial objects with volcanic rock. The prior art discloses a storage tank with a domed roof. Additionally, the prior art discloses method of producing cement using granular, volcanic rock. The prior art discloses a protective coating for sulfur storage vessels that is comprised of a calcium aluminate cement.

BRIEF SUMMARY OF THE INVENTION

An embodiment of the disclosure meets the needs presented above by generally comprising a plurality of bricks that is each comprised of basalt. In this way each of the bricks can resist ingress of sulfuric compounds into the bricks. The plurality of bricks are arranged to define a floor, a plurality of walls and a roof of a storage tank to contain sulfuric compounds. A grout is positioned between each of the bricks for binding the bricks together to define the storage tank. Additionally, the grout is comprised of calcium silicate to resist the ingress of sulfuric compounds into the grout.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
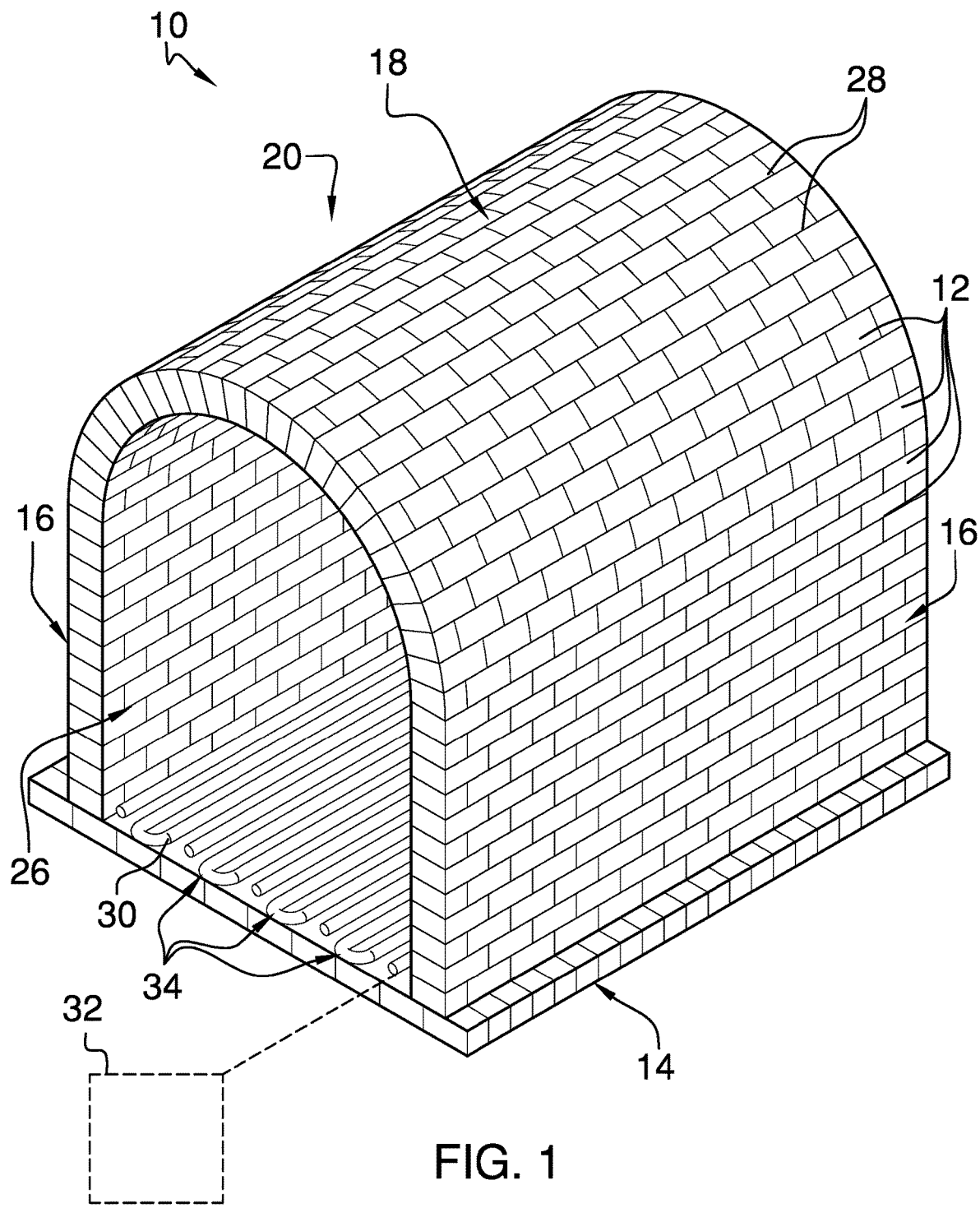
FIG. 1 is a perspective view of a chemical storage tank assembly according to an embodiment of the disclosure.
Figure 2:
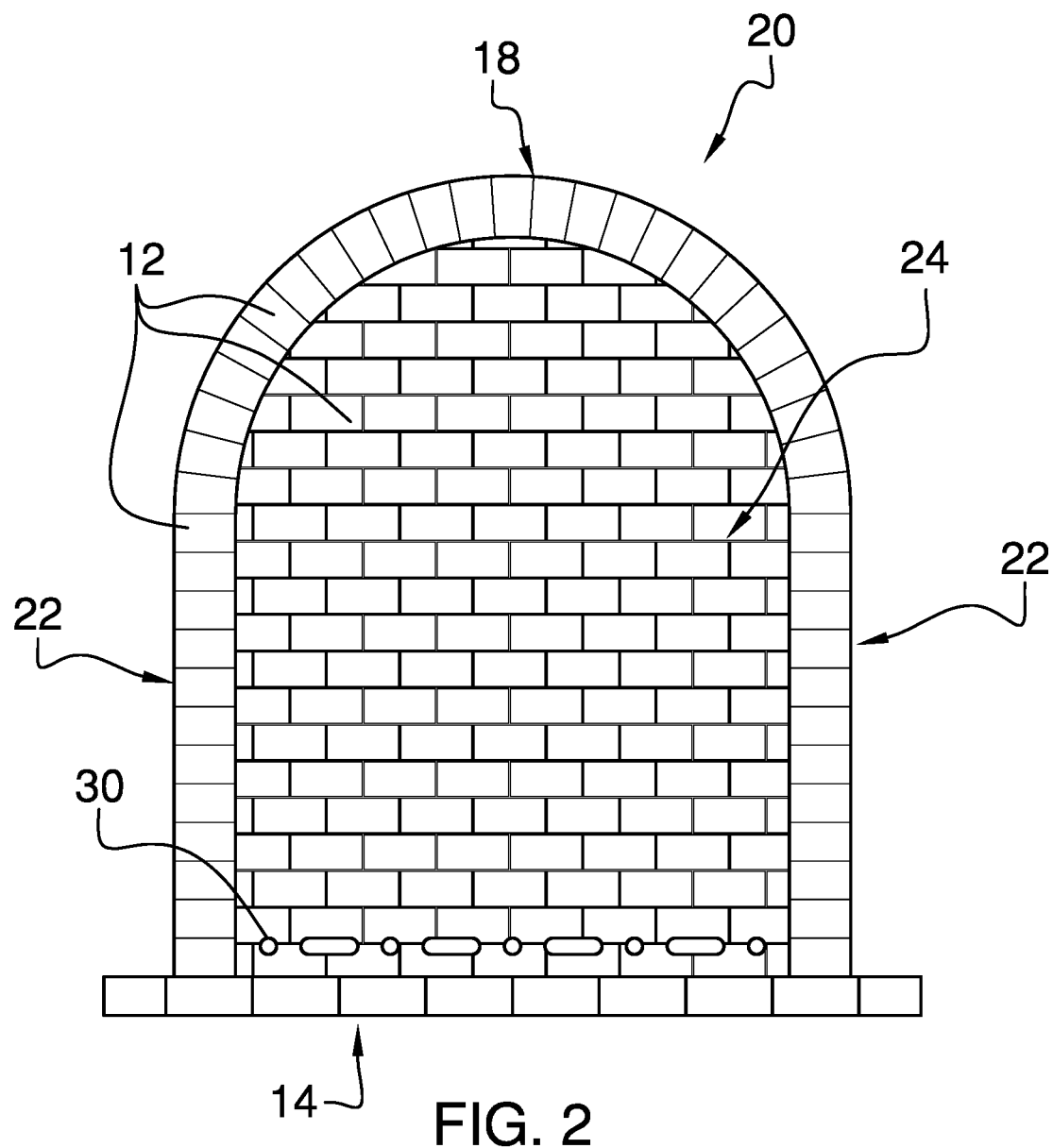
FIG. 2 is a front view of an embodiment of the disclosure.
Figure 3:
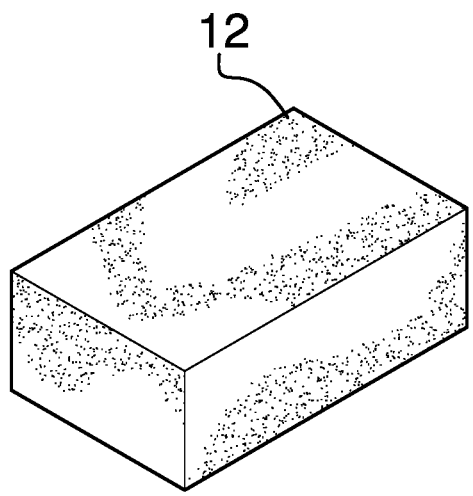
FIG. 3 is a perspective view of a brick of an embodiment of the disclosure.

With reference now to the drawings, and in particular to FIGS. 1 through 4 thereof, a new storage tank device embodying the principles and concepts of an embodiment of the disclosure and generally designated by the reference numeral 10 will be described.

As best illustrated in FIGS. 1 through 4, the chemical storage tank assembly 10 generally comprises a plurality of bricks 12 and is each comprised of basalt such that each of the bricks 12 can resist ingress of sulfuric compounds into the bricks 12. The plurality of bricks 12 is arranged to define a floor 14, a plurality of walls 16 and a roof 18 of a storage tank 20 for containing sulfuric compounds. The sulfuric compounds may be compounds that are produced in crude oil refineries and natural gas plants. The plurality of walls 16 includes a pair of lateral walls 22 and a rear wall 24, and the storage tank 20 has a front end 26 that is open into an interior of the storage tank 20. Moreover, the roof 18 curves upwardly between each of the lateral walls 22 thereby facilitating the roof 18 to support a load without reinforcement. In this way the roof 18 can resist collapse without having steel reinforcement being integrated into the roof 18. Thus, structural failure of the roof 18 is prevented that would otherwise result from the steel reinforcement being corroded by the sulfuric compounds.

The existing method of constructing sulfuric compound storage tanks involves the use of concrete with steel reinforcing. The sulfuric compounds not only degrade and corrode the concrete, but the sulfuric compounds can penetrate the concrete and begin corroding the steel reinforcement. Additionally, sulfuric compound storage tanks are exposed to extreme temperature variance which causes excessive expansion and contraction of the concrete and steel reinforcement, further degrading the structural integrity of the concrete and steel reinforcement. The basaltic bricks 12 are highly non-porous thereby inhibiting the sulfuric compounds from passing into or through the bricks 12. Additionally, basalt has exceptional resistance to thermal expansion and contraction, making it an ideal material for constructing a sulfuric compound storage tank.

A grout 28 is provided and the grout 28 is positioned between each of the bricks 12 for binding the bricks 12 together to define the storage tank 20. Moreover, the grout 28 is comprised of calcium silicate to resist the ingress of sulfuric compounds into the grout 28. Traditionally, cement grout is employed to bind bricks or blocks together. Cement grout is highly porous and thusly susceptible to ingress of the sulfuric compounds. Calcium silicate grout is highly non-porous, thereby inhibiting the ingress of the sulfuric compounds. Additionally, calcium silicate grout has superior thermal performance compared to cement grout.

A tube 30 is provided and the tube 30 is positioned on the floor 14 of the storage tank 20. Additionally, the tube 30 is fluidly coupled to a steam source 32. The tube 30 is arranged into a plurality of loops 34 that are distributed between the pair of lateral walls 22 of the storage tank 20. Additionally, each of the loops 34 extends between the front end 26 of the storage tank 20 and the rear wall 24 of the storage tank 20.

Figure 4:
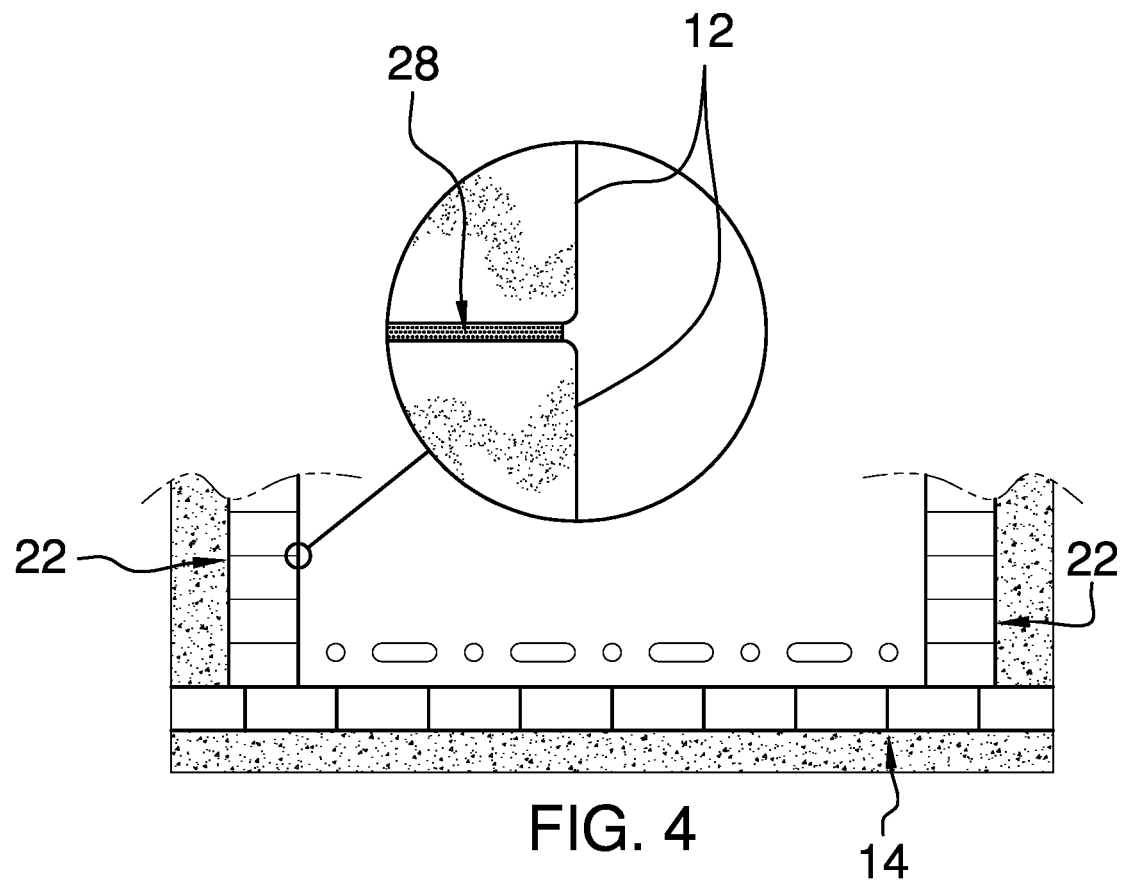
FIG. 4 is a detail view of a grout of an embodiment of the disclosure.

In use, as is shown in FIG. 4, the storage tank 20 is constructed beneath ground in the convention of sulfuric compound storage tanks. The basalt composition of the bricks 12 in inhibits the ingress of the sulfuric compound into the bricks 12 and subsequently degrading the bricks 12. Additionally, the absence of steel reinforcement in the bricks 12 eliminates the possibility of structural failure due to the steel reinforcement being corroded by the sulfuric compounds. The curvature of the roof 18 facilitates the roof 18 to support a load without the need for structural reinforcement. Thus, the storage tank 20 can perform storage of sulfuric compounds for extended periods of time without experiencing the structural degradation and failure that is commonly experienced with reinforced concrete construction.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A chemical storage tank assembly comprising:
   a plurality of bricks, each of said bricks being comprised of basalt, said plurality of bricks being arranged to define a floor, a plurality of walls and a roof of a storage tank wherein said storage tank is configured to contain sulfuric compounds; and
   a grout being positioned between each of said bricks for binding said bricks together to define said storage tank, said grout being comprised of calcium silicate.

2. The assembly according to claim 1, wherein said plurality of walls includes a pair of lateral walls and a rear wall, said storage tank having a front end being open into an interior of said storage tank, said roof curving upwardly between each of said lateral walls thereby facilitating said roof to support a load without reinforcement.

3. The assembly according to claim 2, further comprising a tube being positioned on said floor of said storage tank, said tube being fluidly coupled to a steam source, said tube being arranged into a plurality of loops being distributed between said pair of lateral walls of said storage tank, each of said loops extending between said front end of said storage tank and said rear wall of said storage tank.

4. A chemical storage tank assembly comprising:
   a plurality of bricks, each of said bricks being comprised of basalt, said plurality of bricks being arranged to define a floor, a plurality of walls and a roof of a storage tank wherein said storage tank is configured to contain sulfuric compounds, said plurality of walls including a pair of lateral walls and a rear wall, said storage tank having a front end being open into an interior of said storage tank, said roof curving upwardly between each of said lateral walls thereby facilitating said roof to support a load without reinforcement;
   a grout being positioned between each of said bricks for binding said bricks together to define said storage tank, said grout being comprised of calcium silicate; and
   a tube being positioned on said floor of said storage tank, said tube being fluidly coupled to a steam source, said tube being arranged into a plurality of loops being distributed between said pair of lateral walls of said storage tank, each of said loops extending between said front end of said storage tank and said rear wall of said storage tank.

5. A method of constructing a sulfuric compound storage tank, the steps of the method comprising:
   providing a plurality of bricks each being comprised of basalt;
   providing a grout being comprised of calcium silicate;
   arranging said bricks to define a storage tank having a floor, a pair of lateral walls, a rear wall and a roof being curved upwardly between each of said lateral walls such that said roof is capable of supporting a load without being reinforced wherein said storage tank is configured to contain the sulfuric compound;
   placing said grout between each of said bricks for binding said bricks together to form said storage tank;
   providing a tube being arranged into a plurality of loops;
   placing said tube on said floor such that said plurality of loops is distributed between said pair of lateral walls; and
   connecting said tube to a steam source thereby facilitating said tube to receive the steam thereby facilitating said tube to heat the sulfuric compound.

\* \* \* \* \*